United States Patent [19]

Kerber et al.

[11] 4,191,006

[45] Mar. 4, 1980

[54] FLOATING CUTTERBAR KNIFE DRIVE

[75] Inventors: Dathan R. Kerber, Bettendorf, Iowa; Orlin W. Johnson, East Moline, Ill.; Robert D. Week, Bloomington, Minn.

[73] Assignee: International Harvester Company, Chicago, Ill.

[21] Appl. No.: 904,164

[22] Filed: May 8, 1978

[51] Int. Cl.² ............................................. A01D 69/08
[52] U.S. Cl. ........................................ 56/11.6; 56/208; 56/DIG. 15
[58] Field of Search ......... 56/11.6, 257, 208, DIG. 10, 56/DIG. 15, 17.2, 17.6, 15.3, 15.9, 15.8; 74/242.1 A, 242.11 A

[56] References Cited

U.S. PATENT DOCUMENTS

| | | | |
|---|---|---|---|
| 2,459,379 | 1/1949 | Hanson | 56/123 |
| 3,014,328 | 12/1961 | Scarnato et al. | 56/15.3 |
| 3,763,715 | 10/1973 | Pollard et al. | 74/242.11 A |
| 3,837,291 | 9/1974 | Umlor | 74/242.1 A |
| 3,982,383 | 9/1976 | Mott | 56/11.6 |
| 4,011,709 | 3/1977 | Mott et al. | 56/11.6 |

Primary Examiner—Louis G. Mancene
Assistant Examiner—Paul J. Hirsch
Attorney, Agent, or Firm—Neal C. Johnson; F. David AuBuchon

[57] ABSTRACT

A crop harvesting header for a combine wherein the header includes a transversely elongated frame having opposite side walls. A cutterbar extends between the side walls and is supported from the header frame for floating movement relative thereto as induced by varying ground profile. The cutterbar is connected to the forward ends of a plurality of transversely spaced runners pivotally connected to the header frame. One of the runners is disposed at an end of the header frame adjacent to one of the side walls. Reciprocating drive for the cutterbar is provided by a wobble drive mounted on the end runner and a belt drive therefor mounted on the adjacent side wall. A belt tightener pulley assembly is pivotally mounted on the side wall. A mechanical linkage directly interconnects the pulley assembly with the end runner such that the pulley assembly is shifted in response to movement of the end runner to provide substantially instantaneous change in belt drive geometry created by and to compensate for cutterbar movement relative to the header.

5 Claims, 3 Drawing Figures

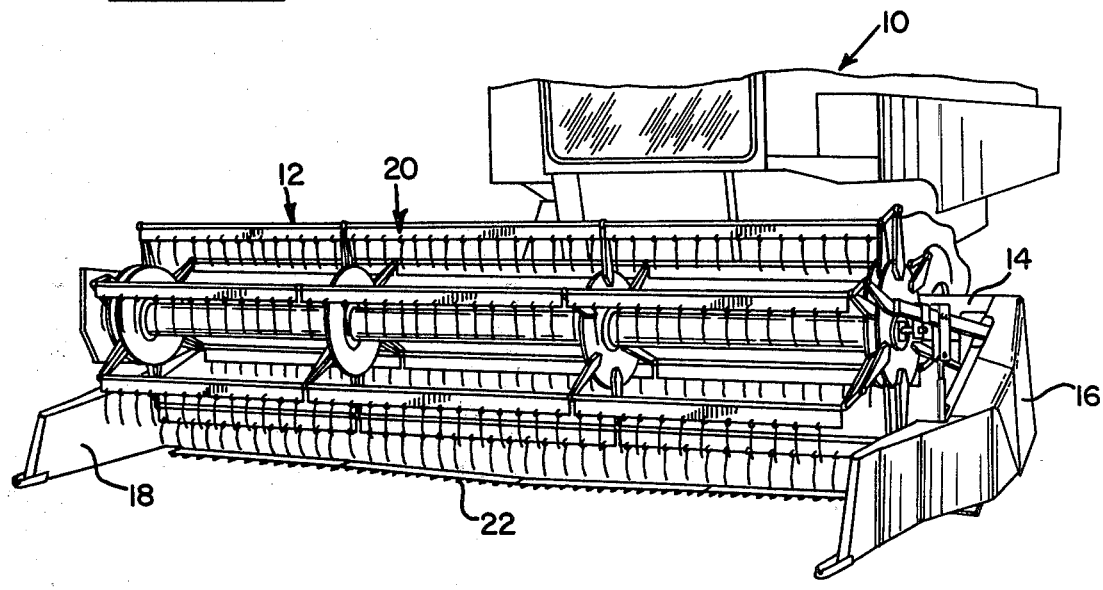
FIG_1_
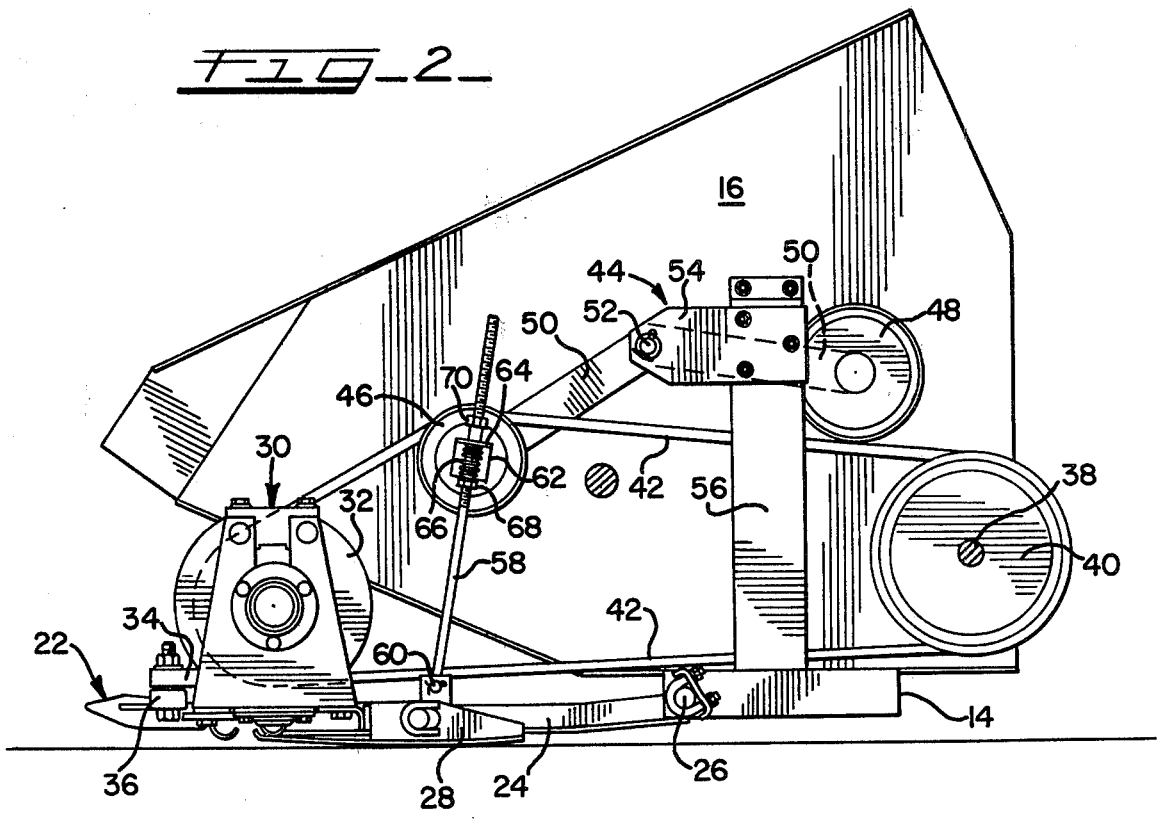
FIG_2_

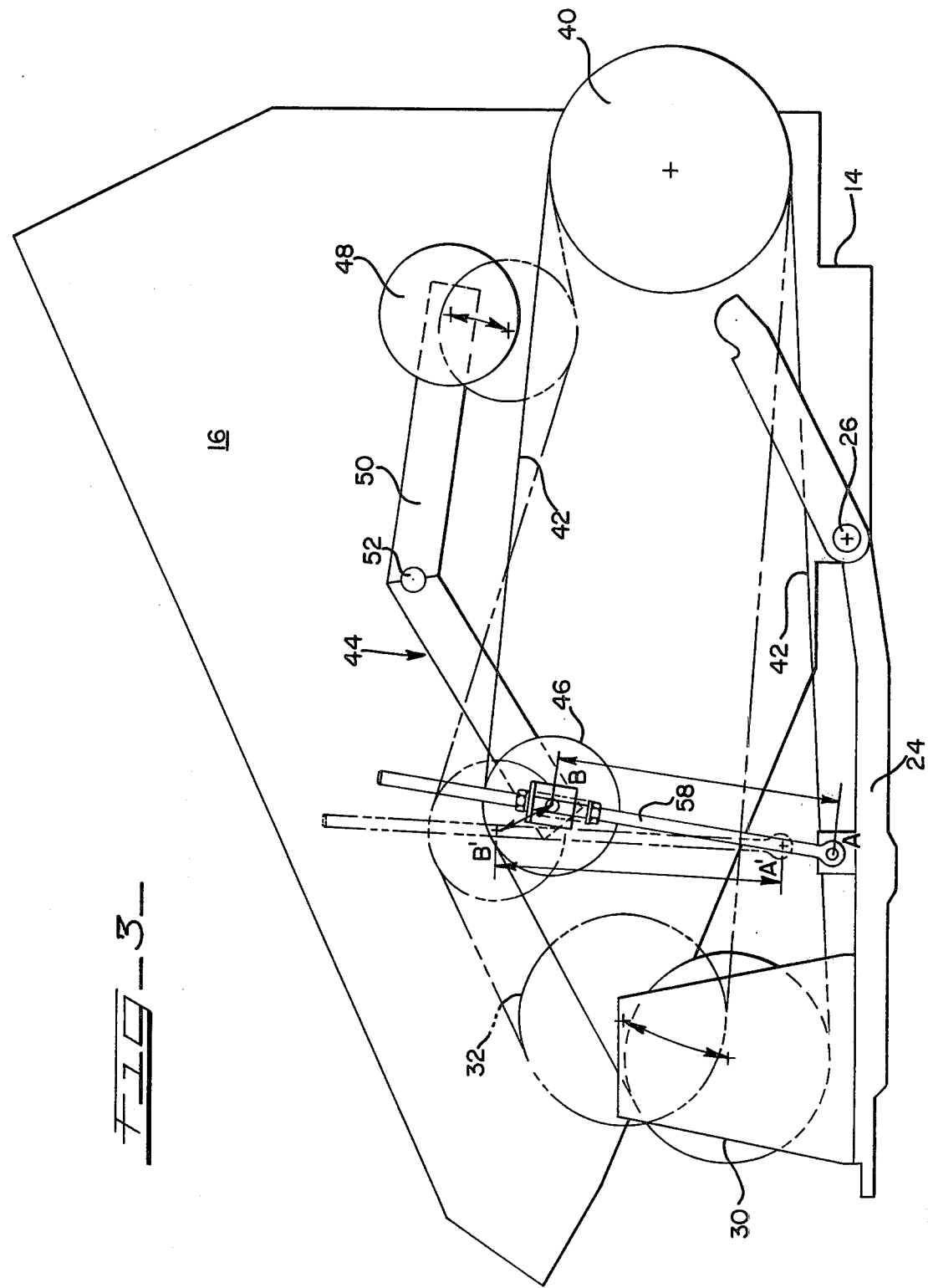

FLOATING CUTTERBAR KNIFE DRIVE

BACKGROUND OF THE INVENTION

1. Field of the Invention:

The invention relates generally to crop harvesting headers having "floating" cutterbars and more particularly to an improved drive system for such a cutterbar.

2. Description of the Prior Art:

U.S. Pat. No. 3,982,383 discloses a header having a floating cutterbar driven by a wobble drive mounted on the cutterbar. A spring-loaded idler pulley 112 maintains tension in the drive belt. The cutterbar is mounted on a plurality of parallel bar-type mechanisms 56. An example of maintaining belt tension throughout header movement is also shown in U.S. Pat. No. 2,459,379 wherein an idler pulley 54 is movable to maintain tension in the drive belt as the drive geometry changes.

In both of the above examples the idler pulley is spring-loaded and thus subject to a loading force which varies in accordance with variations in the spring force due to extension and retraction of the spring in operation. Moreover, in U.S. Pat. No. 3,982,383 the spring-loaded idler is moved in response to changes in the forces exerted on and by the drive belt. Since the drive belt itself is subject to variable loading, movement due to drive speed variations, stretching, and movement due to machine vibration and bouncing in field operation, it is ultimately an imprecise indicator of drive system changes.

A further problem associated with crop headers having reciprocating type cutterbars is accommodating loads imposed in the conversion of rotary to reciprocating movement. The problems become more complex where the cutterbar is of a floating type movable relative to the supporting header frame. In the prior art the wobble drive unit is mounted on and supported by the cutterbar with the result that lateral loads from the reciprocating knife are transferred to the wobble drive unit, to the cutterbar, and ultimately back to the header frame through the cutterbar mounting structure.

SUMMARY

The invention provides an improved crop harvesting header having a cutterbar which is mounted for "floating" or vertical movement relative to the header and featuring an improved drive system for the cutterbar. The drive system includes a wobble drive which is mounted on the structure which supports the cutterbar from the header. Rotary drive input to the wobble drive is provided by a belt drive on the header. Since the geometry of the belt drive changes due to movement of the wobble drive relative to the header, means are provided to directly interconnect the cutterbar support structure with the belt drive to maintain effective drive belt tension. That is, vertical movement of the wobble drive is translated directly to a belt tightener assembly operative on the drive belt. Unlike prior art belt tightener assemblies which operate in response to changes in the belt itself (having variables in loading, tension, position, and stretching), the invention provides positive and direct control of the belt rather than being controlled by the belt with all its variables.

A further advantage of the invention is that the wobble drive unit itself is mounted on one of the principal structural members which connect the cutterbar to the header frame. Thus, the loads from the drive unit are imposed directly onto a structural member rather than onto the cutterbar which is preferably designed for crop cutting rather than external load carrying.

Briefly, the objects of the invention are to provide a floating cutterbar drive system which: positively controls the drive belt in response to changes in the drive geometry; maintains proper drive belt tension; minimizes the effect of drive belt variables; and wherein the dynamic loads are effectively absorbed by the header within which the drive system is incorporated.

BRIEF DESCRIPTION OF THE DRAWINGS

FIG. 1 is a perspective view of a combine having a header incorporating the drive system of the invention;

FIG. 2 is an enlarged end view of the header of FIG. 1 showing the drive system of the invention; and FIG. 3 is a schematic view illustrating the change in drive geometry created by movement of the cutterbar.

DESCRIPTION OF THE PREFERRED EMBODIMENT

Referring first to FIG. 1 there is shown a portion of a self-propelled combine 10 having a header 12 mounted on the forward end thereof. The header 12 includes a header frame 14 having opposite end walls 16 and 18. A conventional crop gathering reel 20 is disposed between the side walls 16 and 18 for sweeping the crop rearwardly for cutting by a cutterbar 22 disposed along the length of the header.

The cutterbar 22 is of the so-called "floating" type which rides close to the ground and is movable up and down relative to the header frame in accordance with variable ground profile. The cutterbar 22 is pivotally supported on the header frame 14 by a plurality of fore-and-aft extending transversely spaced members or runners one of which being shown at 24 in FIGS. 2 and 3. The member 24 is pivotally connected to the frame 14 by a pivot connection 26. It will be understood that each of the members 24 is pivotally connected to the frame in the same manner with the pivot connections being coaxially aligned. It will thus be seen that the cutterbar 22 can move generally vertically about the aligned pivot connections 26. In practice the cutterbar-supporting members 24 are each provided with a ground-engaging slide 28 which thus support the cutterbar 22 on the ground.

In accordance with the invention the endmost member 24 shown in FIGS. 2 and 3 is disposed such that portions thereof are outside the side wall 16. A wobble drive 30 is mounted on the member 24 rearwardly of the cutterbar 22 and outside the end wall 16. The wobble drive 30 is of well known conventional design and includes a rotary input pulley 32 and a reciprocating output arm 34 connected to a sickle 36 of the cutterbar assembly 22.

Rotary power for the wobble drive 30 is transmitted through a belt drive system mounted on the end wall 16. Power is supplied from the combine 10 in conventional manner to a drive input shaft 38 journalled on the rear of the header frame 14 and projecting outwardly beyond the end wall 16. A drive pulley 40 is secured on the drive shaft 38. An endless flexible drive belt 42 is trained about the pulleys 40 and 32 to transmit driving power to the wobble drive 30.

The belt drive system includes an idler pulley assembly 44 operative on the drive belt 42 to provide proper belt tension and tracking. The assembly 44 includes a pair of idler pulleys 46 and 48 journalled on opposite ends of a bell crank 50. The bell crank 50 is journalled for swinging movement on a pin 52 extending horizontally between the end wall 16 and an outwardly spaced bracket 54. The bracket 54 is bolted to a vertical standard 56 secured at its lower end to the header frame 14 and at its upper end to the end wall 16. The idler pulleys 46 and 48 are arranged to engage the upper run of the belt 42 in what might be termed a double wrap. That is, the pulley 46 engages the underside of the belt and the pulley 48 engages the upper side.

The invention further provides a direct interconnection of the runner 24 with the idler assembly 44 to provide belt control directly in response to up and down movement of the cutterbar 22 in field operation. A rod 58 is pivotally connected at 60 to the runner 24 and projects upwardly into connection with the pulley 46. This latter connection includes an L-shaped bracket 62 secured to the crank 50 through the center of the pulley 46. The rod 58 extends through a transverse flange 64 of the bracket 62 with a loose fit permitting relative movement. A coil spring 66 is disposed on the rod 58 between a nut 68 threaded on the rod 58 and the flange 64 of the bracket 62. Another nut 70 is threaded on the rod 58 slightly spaced above the flange 64.

In operation upward movement of the cutterbar 22 as induced by ground level variations causes the runner 24 and attached wobble drive 30 to shift upwardly relative to the remainder of the header. The resulting change in drive geometry is compensated for by the idler assembly 44 virtually instantaneously. That is, the rod 58 moves with the runner 24 and through the nut 68, spring 66, and member 62, the crank 50 is shifted. In practice the spring 66 acts as a solid link in this movement and in addition provides a force to take up for belt stretch over prolonged operation. Upon downward movement of the cutterbar 22 the rod 58 is pulled downwardly and the idler pulley 46 moves downwardly nearly the same distance as point 60. Thus, instead of reacting to changes in the belt itself the invention positively and continuously disposes the belt in proper position to accommodate cutterbar movement while maintaining effective drive tension.

What is claimed is:

1. A harvesting header for a mobile harvesting machine, comprising:
   a header frame having opposite end walls;
   a floating cutterbar for cutting a standing crop;
   means mounting said cutterbar on said header frame for ground-induced vertical movement relative thereto to accommodate variable ground profile, said means including a fore-and-aft extending runner connected to the cutterbar and pivotally connected to the header frame, said runner being disposed adjacent to one of said side walls;
   a drive system for the cutterbar including a wobble drive mounted on said end runner and a belt drive therefor mounted on said one side wall;
   and means defining a positive interconnection between said end runner and said belt drive to provide continuous change in belt drive geometry created by and to compensate for cutterbar movement relative to the header in operation.

2. The subject matter of claim 1, wherein said means defining a positive interconnection includes an idler pulley assembly swingably mounted on said one side wall to provide drive belt engagement, and a mechanical linkage interconnecting said end runner with said pulley assembly whereby the pulley assembly is movable in response to movement of the end runner.

3. The subject matter of claim 2, wherein said linkage includes an elongated rod pivotally mounted on said end runner and extending upwardly into operative connection with said pulley assembly.

4. The subject matter of claim 3, wherein said linkage further includes a spring operably interconnecting said rod and said idler pulley assembly for maintaining a tightening force on the belt as the belt stretches in prolonged use.

5. The subject matter of claim 1, wherein said wobble drive is mounted on said end runner rearwardly of said cutterbar whereby operating loads on said wobble drive are transferred through said end runner to the header frame.

* * * * *